(12) United States Patent
Balkau et al.

(10) Patent No.: US 9,545,748 B2
(45) Date of Patent: Jan. 17, 2017

(54) METHOD AND DEVICE FOR BLOW-MOLDING CONTAINERS

(75) Inventors: Karl-Heinz Balkau, Oststeinbek (DE); Martin Matthiesen, Hamburg (DE); Frank Haesendonckx, Hamburg (DE)

(73) Assignee: KHS CORPOPLAST GMBH, Hamburg (DE)

( * ) Notice: Subject to any disclaimer, the term of this patent is extended or adjusted under 35 U.S.C. 154(b) by 0 days.

(21) Appl. No.: 12/921,260

(22) PCT Filed: Feb. 2, 2009

(86) PCT No.: PCT/DE2009/000150
§ 371 (c)(1),
(2), (4) Date: Oct. 27, 2010

(87) PCT Pub. No.: WO2009/109159
PCT Pub. Date: Sep. 11, 2009

(65) Prior Publication Data
US 2011/0037189 A1     Feb. 17, 2011

(30) Foreign Application Priority Data
Mar. 6, 2008   (DE) .................. 10 2008 013 419

(51) Int. Cl.
*B29C 49/78* (2006.01)
*B29C 49/42* (2006.01)
(Continued)

(52) U.S. Cl.
CPC ............. *B29C 49/78* (2013.01); *B29C 49/783* (2013.01); *B29C 49/06* (2013.01); *B29C 49/12* (2013.01);
(Continued)

(58) Field of Classification Search
CPC ........ B29C 49/00; B29C 49/78; B29C 49/783; B29C 2949/78294; B29B 11/00; B29K 2067/00
(Continued)

(56) References Cited

U.S. PATENT DOCUMENTS 3,795,719 A   3/1974   Morecroft
3,865,530 A   2/1975   Seifert
(Continued)

FOREIGN PATENT DOCUMENTS

DE       2352926        4/1975
DE       2352926 A1     4/1975
(Continued)

OTHER PUBLICATIONS

Schmidt F M et al: "Experimental Study and Numerical Simulation of the Injection Stretch/Blow Molding Process", Polymer Engineering & Science, NJ, US, vol. 38, No. 9, Sep. 1, 1998, p. 1399-1412, XP000848893, ISSN: 0032-3888.

*Primary Examiner* — Nahida Sultana
(74) *Attorney, Agent, or Firm* — Lucas & Mercanti, LLP; Klaus P. Stoffel

(57) ABSTRACT

The method and the device are used for blow-molding containers. A preform made of a thermoplastic material is first subject to a thermal conditioning operation along a transport path in the region of a heating section. Thereafter, the preform is formed into the container inside a blowing mold by applying blowing pressure. While the preform is shaped into the container, at least one parameter (49, 50) characterizing the shaping is measured and evaluated by a control unit. Depending on said evaluation, at least one controlled variable (48, 46) influencing the shaping operation inside a closed loop is varied in order to match the measured parameter to an associated target value. In this way, it becomes possible to subject the container parison (Continued)

Figure 1:
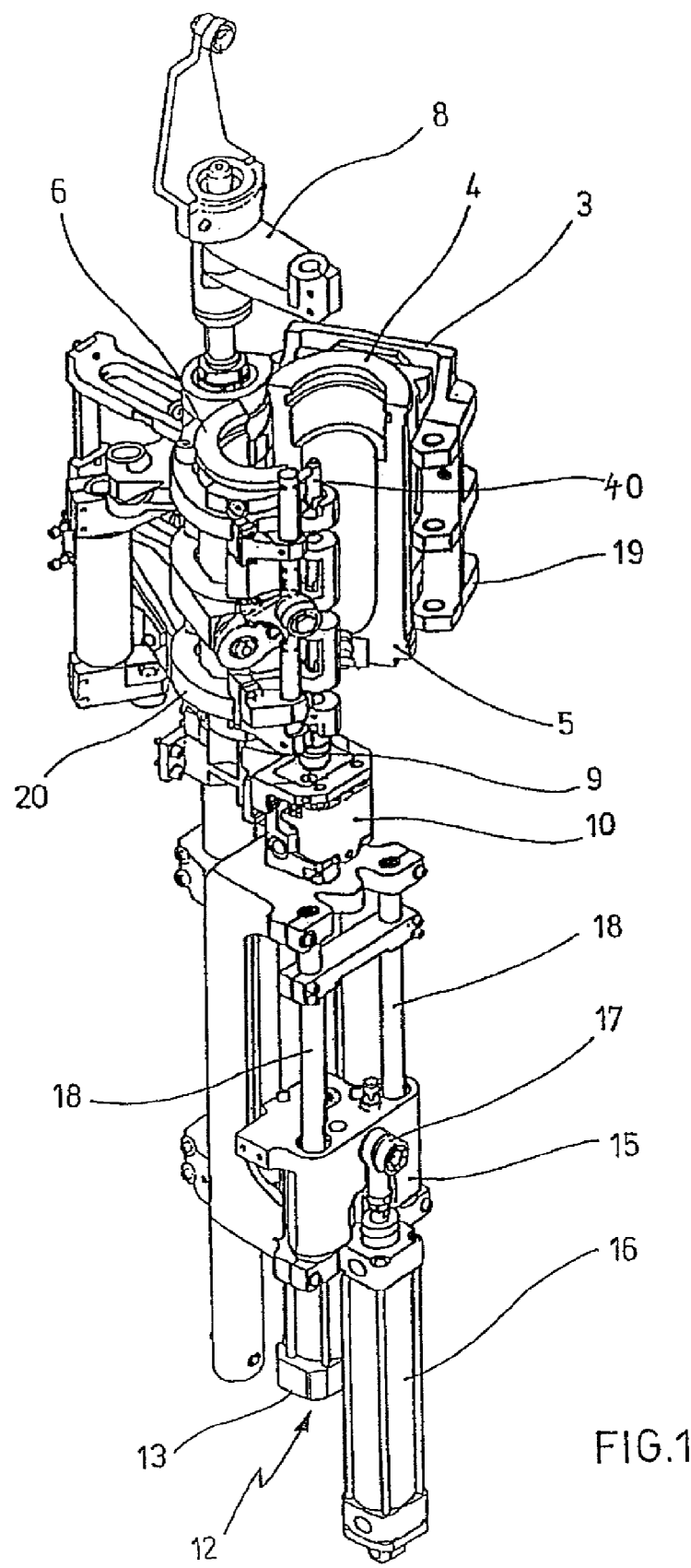

developing during the blow-molding operation to a predetermined defined development.

37 Claims, 6 Drawing Sheets

(51) Int. Cl.
| | |
|---|---|
| B29C 49/06 | (2006.01) |
| B29C 49/12 | (2006.01) |
| B29C 49/36 | (2006.01) |
| B29C 49/64 | (2006.01) |
| B29K 67/00 | (2006.01) |
| B29L 31/00 | (2006.01) |

(52) U.S. Cl.
CPC ............ B29C 49/36 (2013.01); B29C 49/6418 (2013.01); B29C 2049/129 (2013.01); B29C 2049/1257 (2013.01); B29C 2049/1266 (2013.01); B29C 2949/7805 (2013.01); B29C 2949/78025 (2013.01); B29C 2949/7842 (2013.01); B29C 2949/78058 (2013.01); B29C 2949/7889 (2013.01); B29C 2949/78109 (2013.01); B29C 2949/78294 (2013.01); B29C 2949/78369 (2013.01); B29C 2949/78378 (2013.01); B29C 2949/78487 (2013.01); B29C 2949/78495 (2013.01); B29C 2949/78571 (2013.01); B29C 2949/78621 (2013.01); B29C 2949/78806 (2013.01); B29C 2949/78882 (2013.01); B29C 2949/78932 (2013.01); B29K 2067/00 (2013.01); B29L 2031/7158 (2013.01)

(58) Field of Classification Search
USPC ........ 264/40.1, 523, 572–573; 425/150, 522, 425/529
See application file for complete search history.

(56) References Cited

U.S. PATENT DOCUMENTS

| | | | |
|---|---|---|---|
| 4,076,071 A | 2/1978 | Rosenkranz | |
| 4,295,811 A * | 10/1981 | Sauer | 425/112 |
| 4,364,721 A * | 12/1982 | Rainville | 425/149 |
| 4,409,161 A * | 10/1983 | Harry et al. | 264/40.1 |
| 4,437,825 A * | 3/1984 | Harry et al. | 425/145 |
| 4,484,884 A * | 11/1984 | Wiatt et al. | 425/534 |
| 5,087,398 A * | 2/1992 | Le Molaire et al. | 264/40.5 |
| 5,202,068 A * | 4/1993 | Mayer | B29C 47/0026 264/209.2 |
| 5,264,163 A | 11/1993 | Lemelson | |
| 5,269,672 A * | 12/1993 | DiGangi, Jr. | 425/150 |
| 5,269,985 A | 12/1993 | Kanou | |
| 5,346,386 A | 9/1994 | Albrecht et al. | |
| 5,360,329 A | 11/1994 | Lemelson | |
| 5,419,866 A * | 5/1995 | Valyi | B29C 49/18 264/521 |
| 5,622,735 A * | 4/1997 | Krishnakumar et al. | 425/530 |
| 5,648,026 A | 7/1997 | Weiss | |
| 5,665,399 A | 9/1997 | Enderby | |
| 5,681,520 A * | 10/1997 | Koda et al. | 264/520 |
| 5,866,175 A * | 2/1999 | Latham | 425/170 |
| 5,939,153 A * | 8/1999 | Valyi | B29B 11/14 215/12.1 |
| 6,152,723 A * | 11/2000 | Winter et al. | 425/526 |
| 6,186,760 B1 * | 2/2001 | Latham | 425/150 |
| 6,576,171 B1 | 6/2003 | Devenoges | 264/40.1 |
| 6,577,919 B1 * | 6/2003 | Tomonaga | B21D 26/055 164/6 |
| 6,839,652 B2 * | 1/2005 | Shelby et al. | 702/130 |
| 6,855,289 B2 * | 2/2005 | Krishnakumar et al. | 425/516 |
| 6,932,102 B2 * | 8/2005 | Dupuis | 137/115.04 |
| 7,141,192 B2 * | 11/2006 | Osaki | 264/40.1 |
| 7,399,435 B2 * | 7/2008 | Dunzinger et al. | 264/40.1 |
| 7,491,358 B2 * | 2/2009 | Gernhuber et al. | 264/454 |
| 7,648,662 B2 * | 1/2010 | Pesavento | 264/237 |
| 7,887,742 B2 * | 2/2011 | Linke | B29C 49/78 264/40.1 |
| 8,758,670 B2 * | 6/2014 | Haesendonckx et al. | 264/535 |
| 2002/0011681 A1 * | 1/2002 | Rose | B29C 49/18 264/40.1 |
| 2003/0020193 A1 * | 1/2003 | Hamamoto | B29C 49/0073 264/40.1 |
| 2003/0138512 A1 * | 7/2003 | Girotto | B29C 49/78 425/150 |
| 2004/0070119 A1 * | 4/2004 | Fibbia et al. | 264/531 |
| 2004/0113326 A1 | 6/2004 | Gernhuber | |
| 2004/0173949 A1 | 9/2004 | Storione | |
| 2005/0181087 A1 * | 8/2005 | Hayward | G01N 29/045 425/139 |
| 2005/0194705 A1 | 9/2005 | Smith | |
| 2006/0110483 A1 | 5/2006 | Damerow et al. | |
| 2006/0197263 A1 * | 9/2006 | Crider et al. | 264/529 |
| 2006/0292738 A1 * | 12/2006 | Backlund et al. | 438/106 |
| 2007/0029707 A1 | 2/2007 | Birckbichler | |
| 2007/0031622 A1 * | 2/2007 | Imanari et al. | 428/36.5 |
| 2007/0222123 A1 * | 9/2007 | Bunel | B29C 49/0073 264/572 |
| 2007/0290388 A1 | 12/2007 | Feuilloley | |
| 2008/0057147 A1 * | 3/2008 | Bergami et al. | 425/144 |
| 2008/0211125 A1 | 9/2008 | Derrien | |
| 2009/0146332 A1 * | 6/2009 | Linke et al. | 264/40.1 |
| 2010/0007060 A1 * | 1/2010 | Linke et al. | 264/454 |
| 2010/0139169 A1 * | 6/2010 | Patil et al. | 49/103 |
| 2011/0260350 A1 * | 10/2011 | Haesendonckx et al. | 264/40.1 |
| 2011/0260373 A1 * | 10/2011 | Finger et al. | 264/532 |
| 2011/0291332 A1 * | 12/2011 | Voth et al. | 264/532 |
| 2012/0076965 A1 * | 3/2012 | Silvers et al. | 428/36.92 |
| 2012/0080827 A1 * | 4/2012 | Senn | B29C 49/6418 264/532 |
| 2013/0037996 A1 * | 2/2013 | Fuhrer | B29C 49/46 264/523 |
| 2013/0183468 A1 * | 7/2013 | Gerlach et al. | 428/36.92 |
| 2015/0298385 A1 * | 10/2015 | Linke | B29C 49/56 264/523 |
| 2016/0176099 A1 * | 6/2016 | Knapp | B29C 49/18 264/40.1 |

FOREIGN PATENT DOCUMENTS

| | | |
|---|---|---|
| DE | 4212583 | 10/1993 |
| DE | 4212583 A1 | 10/1993 |
| DE | 4340291 | 6/1995 |
| DE | 19906438 | 8/2000 |
| DE | 19906438 A2 | 8/2000 |
| DE | 10116665 | 10/2002 |
| DE | 102005040905 | 10/2006 |
| EP | 0499136 A | 8/1992 |
| GB | 2221642 | 2/1990 |
| JP | 516136 | 1/1976 |
| JP | 5628830 | 3/1981 |
| JP | H06234152 A2 | 8/1994 |
| JP | 2002507500 A2 | 10/2006 |
| JP | 2008207434 | 9/2008 |
| JP | 2009174673 | 8/2009 |
| JP | 2009272147 | 11/2009 |
| WO | 99/48669 Y | 3/1999 |
| WO | 9948669 A | 9/1999 |
| WO | 03/078136 | 9/2003 |
| WO | 03078136 A | 9/2003 |
| WO | 2005000558 | 1/2005 |
| WO | 2005/092591 | 10/2005 |
| WO | 2006054146 | 5/2006 |
| WO | 2006/108380 | 10/2006 |
| WO | 2006108380 A2 | 10/2006 |
| WO | WO2007/110018 A1 * | 10/2007 |
| WO | 2008081107 | 7/2008 |
| WO | 2008081108 | 7/2008 |
| WO | 2008081109 | 7/2008 |

* cited by examiner

METHOD AND DEVICE FOR BLOW-MOLDING CONTAINERS

This application is a 371 of PCT/DE2009/000150 filed Feb. 2, 2009, which in turn claims the priority of DE 10 2008 013 419.8 filed Mar. 6, 2008, the priority of these applications is hereby claimed and these applications are incorporated by reference herein.

The invention relates to a method for blow-molding containers in which a preform of a thermoplastic material is shaped into the container after a thermal conditioning along a transport path in the area of a. heating section within a blow mold by the influence of compressed air.

The invention, moreover, relates to a device for blow-molding containers of a thermoplastic material which has at least one heating section arranged along a transport path of a preform and a blow station provided with a blow mold.

When shaping a container by compressed air, preforms of a thermoplastic material, for example, preforms of PET (Polyethylene terephthalate), are supplied within a blow-molding machine with different processing stations. Typically, such a blow-molding machine has a heating device in whose area the previously temperature-adjusted preform has been expanded by biaxial orientation into a container. The expansion takes place by means of compressed air which is conducted into the preform to be expanded. The process-technological sequence of such an expansion of the preform is explained in DE OS 43 40 291. The above-mentioned introduction of the pressurized gas also includes the introduction of compressed gas into the developing container bubble as well as the compressed gas introduction into the preform at the beginning of the blow molding process.

The basic configuration of a blow-molding station for shaping the container is described in DE OS 42 12 583. Possibilities for adjusting the temperature of the preforms are explained in DE OS 23 52 926.

Within the device for blow molding, the preforms as well as the blow-molded containers can be transported by means of different manipulating devices. Particularly useful has been found the use of transport mandrels onto which the preforms can be inserted. However, the preforms can also be manipulated by means of different support devices. The use of gripping tongs for manipulating preforms and the use of spreading mandrels which can be introduced for support in the opening area of a preform also are part of the available constructions.

A manipulation for containers with the use of transfer wheels is described, for example, in DE OS 199 06 438 in an arrangement of the transfer wheel between a blow wheel and a discharge section.

The already explained manipulation of the preforms takes place, on the one hand, in the so-called two-stage methods in which the preforms are initially manufactured in accordance with an injection molding process, are subsequently placed in intermediate storage, and are only later conditioned with respect to their temperature, and are blown up into a container. On the other hand, a use takes place in the so-called single-stage methods in which the preforms are suitably adjusted with respect to temperature and are subsequently blown up.

In view of the blow molding stations used, different embodiments are known. In blow molding stations which are arranged on rotating transport wheels, a book-like capability of folding open the preforms can be frequently found. However, it is also possible to use preforms which are movable relative to each other or are of a different type. In stationary blow molding stations, which are particularly suitable for picking up several cavities for forming the containers, typically parallel plates are used as preforms.

Prior to carrying out heating, the preforms are typically placed in transport mandrels which either transport the preform through the entire blow molding machine or travel only along in the area of the heating device. In a stationary heating of the preforms, such that the openings of the preforms are in the vertical direction oriented downwardly, the preforms are conventionally placed on a sleeve-shaped support element of the transport mandrel. In a suspended heating of the preforms, in which the preforms are oriented with their openings facing upwardly in the vertical direction, the spreading mandrels are as a rule inserted into the openings of the preforms for clamping the preforms.

When carrying out a blow-technological container shaping, a significant object is to achieve in the container wall a predetermined material distribution. A significant parameter for predicting the resulting material distribution is realized by the distribution of the heat distribution realized in front of the preform in the preform containers.

The heat distribution is typically realized in such a way that, in a circumferential direction of the preforms, an equal temperature level is produced and in a longitudinal direction of the preforms a temperature profile is produced. Moreover, through the wall of the preform a suitable temperature profile is provided from the outside to the inside. It must essentially be accepted that areas of the preform having a lower temperature lead to thicker wall portions of the blow-molded container, and that the warmer areas of the preform are stretched out more substantially and as a result lead to thinner wall portions of the blow-molded container.

The temperature in the area of the preform can be measured with so-called pyrometers. A measurement-technological determination of a concrete wall thickness in the area of the blow-molded container can be effected by so-called wall thickness sensors which, for example, operate optically or with the use of sound waves.

However, it has been found that a suitable predetermination of the heat distribution alone within the preforms is not sufficient for producing optimum material properties in the blow-molded container. Rather, there exist relatively complex reciprocal effects between the carrying out of the stretching procedure, the pressure build-up within the developing container bladder of the material distribution in the preform, and the temperature distribution in the preform.

It is the object of the present invention to improve a method of the above-mentioned type in such a way that with low structural machine expenses, a qualitatively high-value blow molding in which the throughput rates are simultaneously high.

In accordance with the invention, this object is met by measuring, during the deformation of the preform in the container, at least one parameter which characterizes the deformation and evaluated by a control device, and that in dependence on this evaluation, at least one adjusting value influencing the deformation process is changed within a closed control circuit for adapting the measure to parameter to a corresponding desired value.

An additional object of the present invention is to construct a device of the above-described type in such a way that high throughput rates can be achieved with simple structural construction and with good product quality.

In accordance with the invention, this object is met by connecting at least one sensor for determining at least one parameter which characterizes the deformation of the preform into the container is connected to a control device which has an evaluating unit for this parameter and which generates the at least one adjusting value influencing the deformation procedure and which is arranged in a closed control circuit for adjusting the measured parameter to a corresponding desired value.

In accordance with the invention, it has been discovered that an extremely advantageous method procedure can be achieved by measuring not only the finished blown container, but that already within the blow mold the development of the container bladder is supervised which is produced during the shaping of the preform into the container by this evaluation of the development of the container bladder and through a direct influencing of the parameters influencing this process are controlled significantly more precisely and effectively and can be adapted to the desired properties.

The concrete formation of the developing container bladder can also be determined especially by measuring the developing contact with the developing bladder of the container to an inner side of the blow mold at least temporarily and at least over sections.

The determination of another parameter characterizing the bladder development is possible by measuring the position of the stretching rod.

It is also intended to measure the speed of the stretching rod.

Another variation resides in that a rod force is measured.

Moreover, it is also possible to measure a blowing pressure.

Furthermore, it is also possible to measure a blow gas volume.

A defined maintaining of a predetermined development of the container bladder can be achieved especially by controlling the parameter in accordance with a temporarily changeable desired value profile.

Generally, it is found to be useful that the contact of the container bladder to the blow mold is regulated.

In accordance with an embodiment variation, it is provided that the position of the stretching rod is controlled.

It is also intended to control the speed of the stretching rod.

Moreover, it is also possible to control the rod force.

Another embodiment resides in that the blow pressure is regulated.

Finally, it is also possible to control the blow gas volume.

An influencing of the bladder development can be effected by using as the adjusting value the speed of the rod.

Another embodiment resides in that the stretching rod position is used as a control value.

Moreover, it is intended that the rod force is used as an adjusting value.

Also, it is possible to use the blowing pressure as the adjusting value.

Finally, it is additionally possible that the blow gas volume is used as the adjusting value.

A consideration of the complex interrelationships and mutual influences of the individual factors can have the result that the measuring value is supplied to a regulation-technological model which generates the adjusting value.

A consideration of the complex interrelationships and mutual influences of the individual factors can be effected by supplying the measurement value to a control technical model which generates the adjusting variable.

Figure 2:
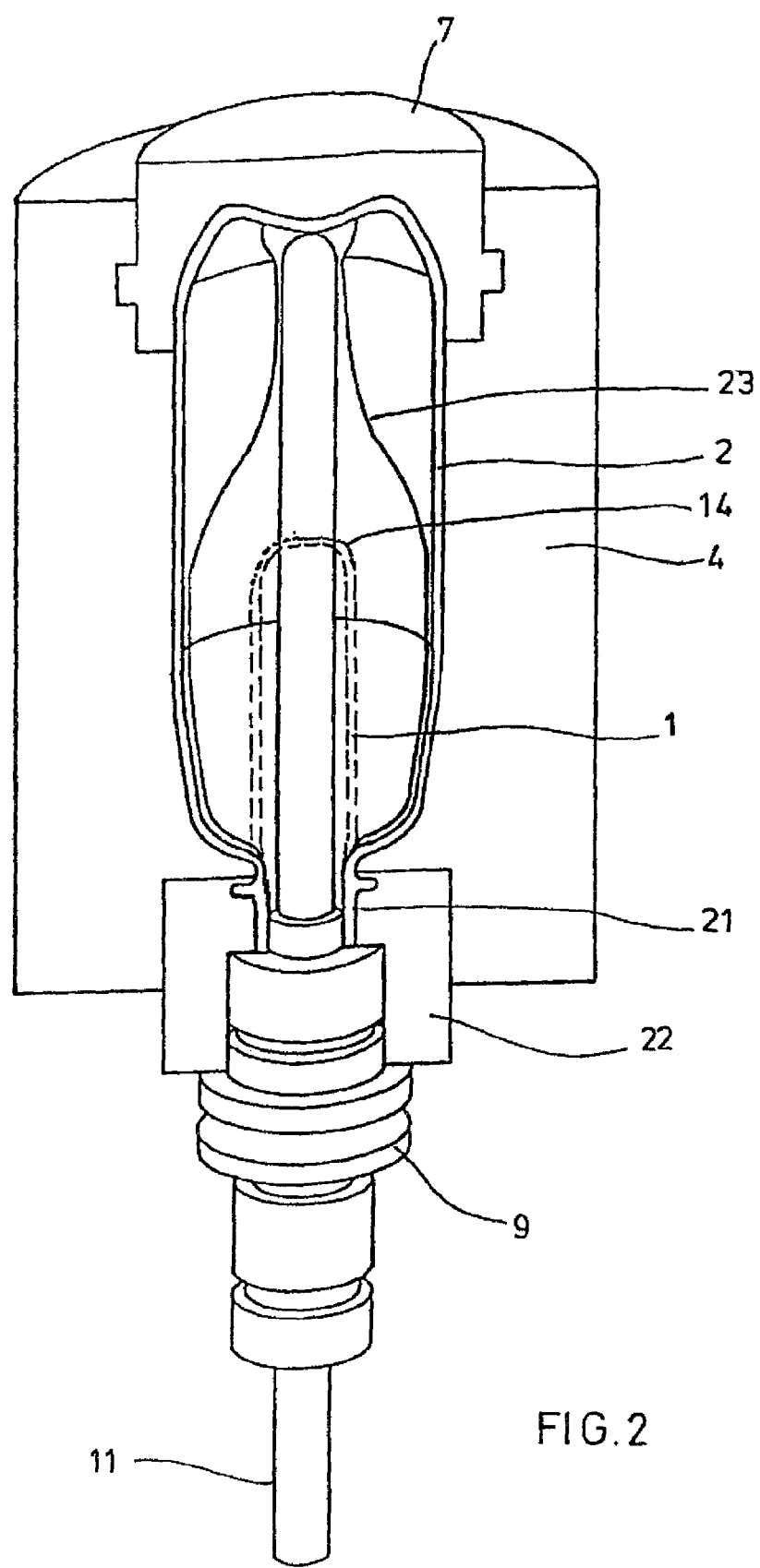
Figure 3:
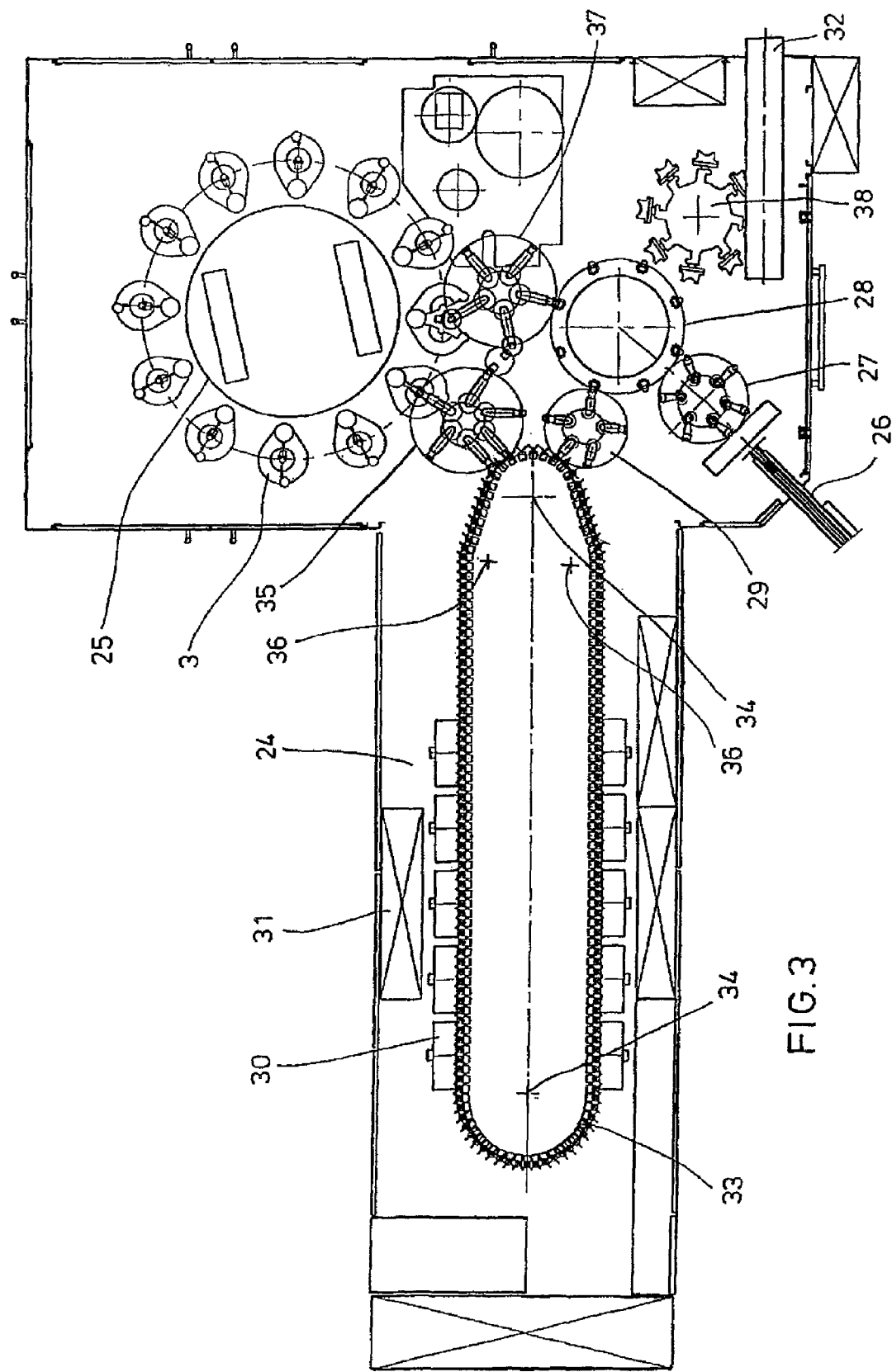
Figure 4:
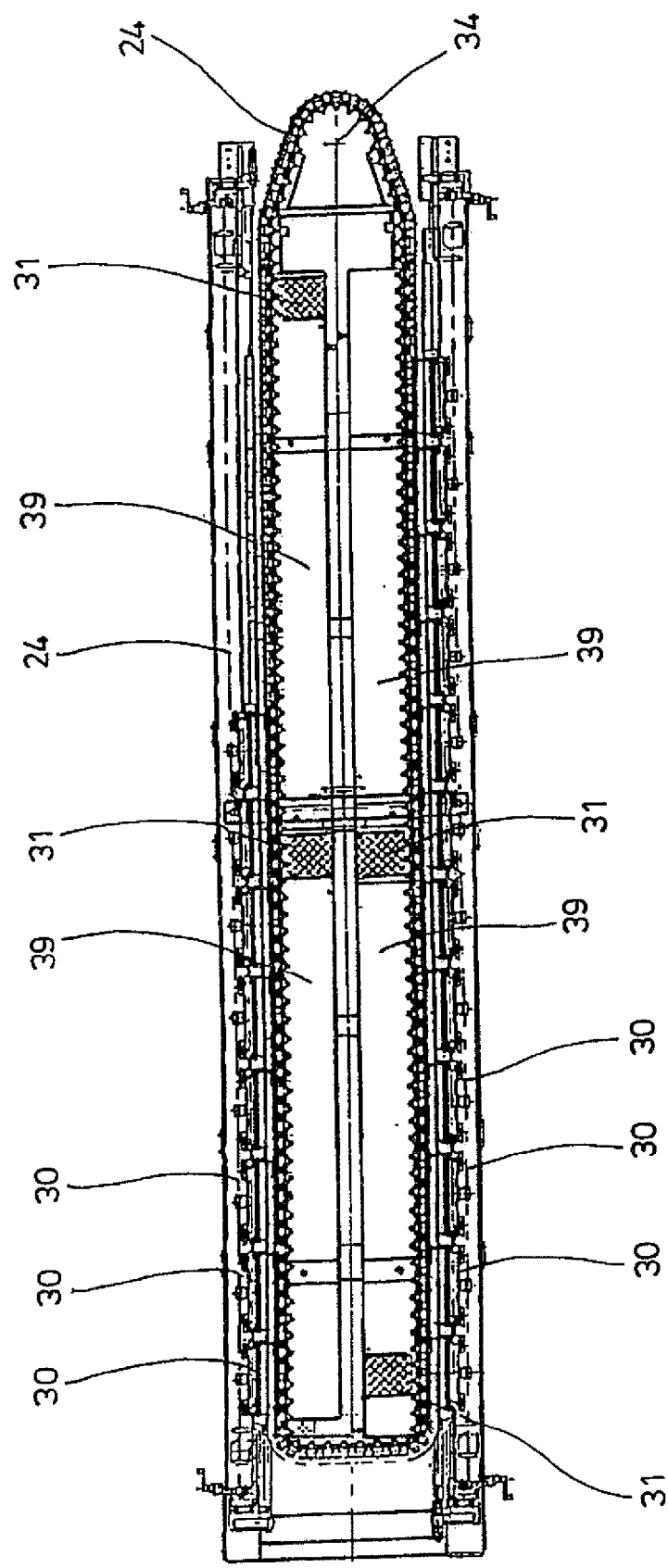
Figure 5:
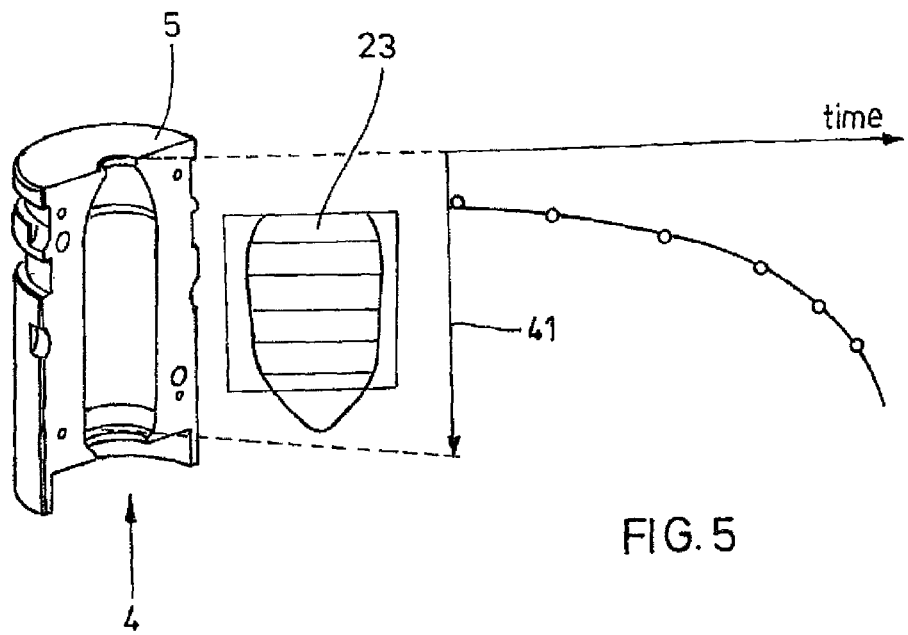
Figure 6:
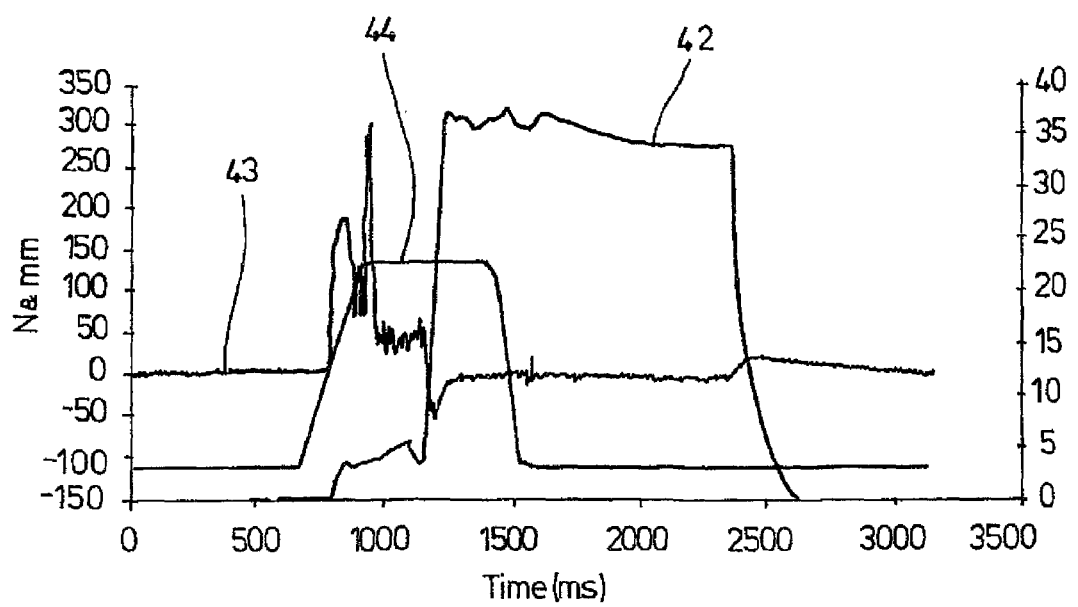
Figure 7:
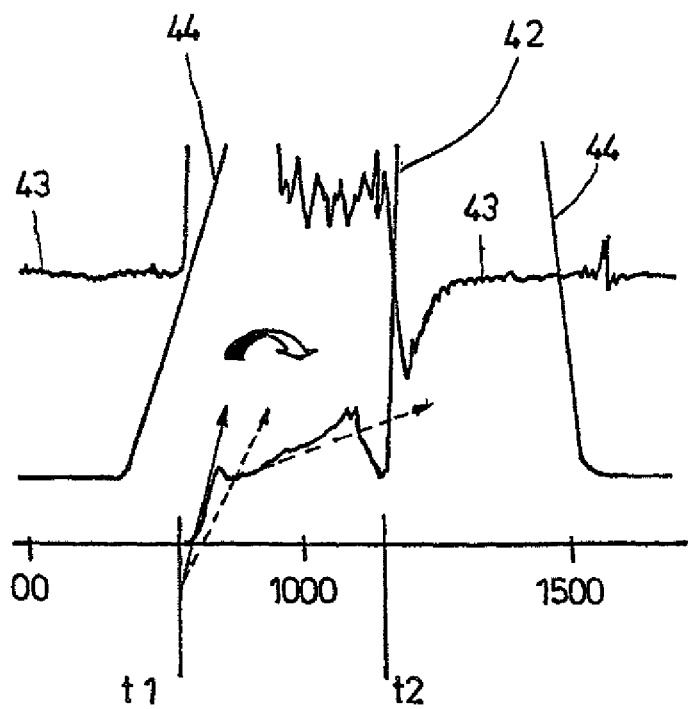
Figure 8:
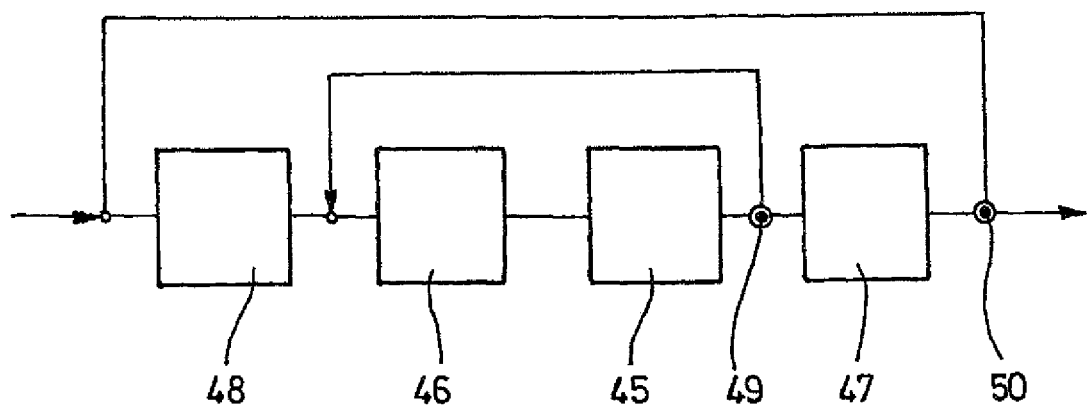

In the drawings, embodiments of the invention are schematically illustrated. In the drawing:

FIG. 1 is a perspective view of a blow molding station for manufacturing containers from preforms, FIG. 2 is a longitudinal sectional view through a blow mold in which a preform is stretched and expanded, FIG. 3 is a sketch for demonstrating a basic construction of a device for blow molding of containers, FIG. 4 is a modified heating section with increased heating capacity, FIG. 5 is a schematic illustration for demonstrating the time sequence of the contact of the container bladder with the inner wall of the blow mold, FIG. 6 shows diagrams for demonstrating the relationships between the time pressure sequence within the preform, the container bladder and the blown container, the stretching rod force development as well as the positioning of the stretching rod, FIG. 7 is an enlarged partial illustration of the sequence according to FIG. 6 with additional reference lines, and FIG. 8 is a schematic illustration of a control concept for controlling the development of the container bladder.

The principal construction of a device for deforming preforms 1 in a blow mold to form containers 2 is illustrated in FIG. 1 and in FIG. 2.

The device for forming the container 2 consists essentially of a blow molding station 3 which is provided with a blow mold 4 into which a preform 1 can be placed. The preform 1 may be an injection molded part of polyethylene terephthalate. For facilitating a placement of the preforms 1 into the blow mold 4 and for facilitating a removal of the finished container 2, the blow mold 4 consists of molding halves 5, 6 and a bottom part 7 which can be positioned by a lifting device 8. The preform 1 can in the region of the blow station 3 be held by a transport mandrel 9 which, together with the preform 1, travels through a multitude of treatment stations within the device. However, it is also possible to place the preform 1 directly in the blow mold 4, for example, by means of tongs or other manipulating means.

For facilitating a compressed air supply, a connecting piston 10 is arranged underneath the transport mandrel 9, wherein the connecting piston 10 supplies compressed air to the preform 1 and simultaneously carries out a sealing action relative to the transport mandrel 9. However, in a modified construction, it is basically also conceivable to use fixed compressed air supply lines.

A stretching of the preform 1 takes place in this embodiment by means of a stretching rod 11 which is positioned by a cylinder 12. In accordance with another embodiment, a mechanical positioning of the stretching rod 11 is carried out through curved segments which are acted upon by tamping rollers. The use of curved segments is particularly advantageous if a plurality of blow-molding stations 3 are arranged on a rotating blow wheel.

In the embodiment illustrated in FIG. 1, the stretching system is constructed in such a way that a tandem arrangement of two cylinders 12 is provided. From a primary cylinder 13, the stretching rod 11 is initially moved before the beginning of the actual stretching procedure up into the area of a bottom 14 of the preform 1. During the actual stretching procedure, the primary cylinder 13 is positioned with extended stretching rod together with a carriage 15 supporting the primary cylinder 13 by a secondary cylinder 16 or by a curved control. In particular, it is intended to utilize the secondary cylinder 16 controlled by curves in such a way that an actual stretching position is predetermined which slides during the carrying out of a stretching procedure slides along a curved path the guide roller 17 is pressed by the secondary cylinder 16 against the guide path. The carriage 15 slides along two guide elements 18.

After closing the mold halves 5,6 arranged in the area of supports 19, 20, the supports 19, 20 are locked relative to each other by means of a locking device.

For adapting to different shapes of an opening section 21 of the preform 1, according to FIG. 2 the use of separate threaded inserts 22 is provided in the area Of the blow mold 4.

FIG. 2 shows in addition to the blow molded container 2 the preform 1 in broken lines and schematically a container bladder 23 which is developing.

FIG. 3 shows the basic construction of a blow molding machine which is provided with a heating section 24 as well as a rotating blow wheel 25. Starting from a preform input 26, the preforms 1 are transported by transfer wheels 27, 28, 29 into the area of the heating section 24. Heating elements 30 as well as blowers 31 are arranged along the heating section 24 in order to adjust the temperature of the preforms 1. After a sufficient temperature control of the preforms 1, the preforms are transferred to the blow wheel 25 in the area of which the blow stations 3 are arranged. The finished blown containers 2 are supplied by additional transfer wheels to a discharge section 32.

In order to be able to transform a preform 1 into a container 2 in such a way that the container 2 has material properties which ensure a long usefulness of foodstuffs filled within the container 2, particularly of beverages, special method steps must be adhered to during heating and orientation of the preforms 1. Moreover, advantageous effects can be achieved by adhering to special dimensioning rules.

Different plastics can be used as the thermoplastic material. For example, PET, PEN or PP can be used.

The expansion of the preforms 1 during the orientation process takes place by the supply of compressed air. The compressed air supply is divided into a pre-blowing phase in which gas, for example, compressed air, is supplied with a low pressure level and is divided into a subsequent principal blowing phase in which the gas is supplied with a higher pressure level. During the pre-blowing phase, typically compressed air having a pressure in intervals of 10 bars to 25 bars is used and during the principal blowing phase compressed air having a pressure in intervals of 25 bars to 40 bars is supplied.

From FIG. 3 it can also be seen that in the illustrated embodiment the heating section 24 is constructed from a plurality of revolving transport elements 33 which are arranged in rows in the manner of chains and are guided along guide wheels 34. It is particularly intended to use the chain-like arrangement for stretching an essentially rectangular basic contour. In the illustrated embodiment, in the area of the extension of the heating section 24 facing the transfer wheel 29 and an input wheel 35, a single essentially relatively large deflection wheel 34 is used and, in a region of neighboring deflections, two relatively smaller deflection wheels 36 are used. Basically, however, any chosen other guides are conceivable.

For facilitating an arrangement of the transfer wheel 29 and the input wheel 35 relative to each other which is as tight as possible, the illustrated arrangement is found to be especially useful because in the area of the respective expansion of the heating section 24 three deflection wheels 34, 36 are positioned, namely the smaller deflection wheels 36 in the area of the linear configuration of the heating section 24 and the larger deflection wheel 34 in the immediate transfer area to the transfer wheel 29 and to the input wheel 35. Alternatively to the use of chain-like transport elements 33, it is also possible, for example, to use a rotating heating wheel.

After a finished blow molding of the containers 2, the containers are moved by a removing wheel 37 out of the area of the blow stations 3 and are transported through the transfer wheel 28 and a discharge wheel 38 to the discharge section 32.

In the modified heating section 24 illustrated in FIG. 4, it is possible because of the larger number of heating elements 30 to adjust the temperature of a larger quantity of preforms 1 per unit of time. The blowers 31 conduct cooling air into the area of cooling air ducts 39 which discharge the cooling air, which cooling air ducts 39 are located opposite each assigned heating element 30 and discharge the cooling air through outlet openings. By arranging the outlet directions, a flow direction for the cooling air essentially transversely of a transport direction of the preforms 1 is realized. The cooling air ducts 39 can make available reflectors for the heat radiation in the area of the surfaces located opposite the heating elements 30; also, it is possible to realize cooling off the heating elements 30 by means of the discharged cooling air.

FIG. 5 shows in a schematic illustration the assignment of a mold half 5 and a container bladder 23. The container bladder 23 develops during the blowing process in the direction of a longitudinal axis 41 of the container as well as transversely of the longitudinal axis 41 of the container. As a consequence of the expansion of the container bladder 23 transversely of the longitudinal axis 41 of the container, the container bladder 23 rests against the inner wall of the blow mold 4. The contact begins typically in an area of the blow mold 4 that faces an outlet cross-section 21 of the container 2, and then progresses in the direction of the bottom part 7. FIG. 5 illustrates the progress of the contact of the container bladder 23 with the blow mold 4 at different points in time.

FIG. 6 illustrates in a diagram the relation of a chronological blow pressure pattern 42, a stretching force development 43 as well as a stretching rod positioning 44. The scale of the time axis takes place in this case in milliseconds and the amplitude values are scaled in bar, Newton or millimeter.

FIG. 6 illustrates that with respect to the positioning of the stretching rod 11, this stretching rod is initially moved essentially without development of a stretching force into the preform 1. After a contact of the stretching rod 11 at the bottom of the preform 1, the latter is stretched and a relatively great development of the stretching force takes place. After the longitudinal stretching is concluded, the remaining stretching force results from the stabilization of the preform in the stretched position while taking into consideration elastic restoring forces within the material of the preform. The blowing pressure sequence 42 shows the division into a pre-blowing phase during the carrying out of the stretching process and a principal blowing phase after a significant conclusion of the stretching procedure.

The contact of the container bladder 23 with the blow mold 4 can be determined, for example, with the use of contact-sensitive sensors. Also possible is a contactless detection, for example, through an electric field measurement or through optical sensors. Additional measuring information is made available by determining the pressure sequence, the gas volume supplied to the container bladder 23, the stretching speed, the stretching force, or the temperature in the material of the preform to be formed. Optionally, one or more of the above-listed parameters can be evaluated. The measurement-technological determination of the above-mentioned parameters also includes an indirect determination of the above parameters through the measurement-technological determination of auxiliary parameters which can be assigned to the above parameters, and an appropriate conversion.

By utilizing the measurement information made available, it is particularly possible to determine the deformation work or deformation energy which was supplied to the material during the blow molding process.

In accordance with a preferred embodiment, the parameters which were measured or determined as a result of measurements, which characterize the development of the container bladder 23, are supplied to a control-technological model and are there evaluated in a suitable manner for generating adjusting values. Preferably, a stretching system is used in which the stretching speed and/or the stretching rod positioning and/or the stretching force are controllable or regulatable. Also useful are, for example, stretching systems with spherical thread spindles, controlled pneumatic stretching systems or stretching systems on the basis of electrical linear motors or servo motors.

In accordance with an embodiment, it is possible to determine the speed of the bladder development and for example, if the bladder development is too fast, to increase the speed of the stretching process so that the stretching rod positioning can follow the bladder development and a guidance and centering of the developing container bladder 23 by the stretching rod 11 is ensured.

In accordance with another embodiment, it is possible, when the speed of development of the container bladder 23 is too low, to reduce the stretching speed and thereby to realize a predetermined time relationship of transverse and longitudinal stretching.

In accordance with another embodiment, the position of the stretching rod 11 is measured and the blowing pressure supply is controlled. This can take place, for example, with the use of a proportional valve. In accordance with another embodiment, it is not the blowing pressure, but the volume of blowing air supplied to the developing container bladder 23 that is predetermined.

In accordance with another embodiment, the stretching force is measured. If the stretching force is reduced at a predetermined stretching speed, it can be concluded therefrom that the container bladder 23 develops too quickly and the longitudinal stretching takes place at least only partially through the stretching rod 11 and at least partially through the internal pressure in the container bladder 23. When such a condition is recognized, the volume of blowing gas which is supplied per unit of time can be reduced. Conversely, with an increase of the stretching force, which can be the result of a development speed of the container bladder 23 which is too low, the inflow of blowing gas can be increased.

In accordance with another preferred embodiment, the control-technological model already described above includes a multi-dimensional parameter space of desired values. As long as the resulting actual values stay within a corresponding multi-dimensional target space, it can be concluded that an optimum process sequence takes place. If at least one of the respective parameters leaves the space of desired values, a correction is required at least of one of the available adjusting valuables.

FIG. 7 shows for the pre-blowing phase which is between the points in time t1 and t2, possible variations of the pressure increase speed due to suitable adjusting value variations. The interval between t1 and t2 typically has a duration of 50 to 100 milliseconds. The influence on the bladder development takes place as a result of the two illustrated variants of the increase of the blowing pressure sequence 42 during the carrying out of the first phase of the stretching process or after the first pressure build-up.

FIG. 8 schematically and in a significantly simplified embodiment shows a possible control circuit for influencing the development of the container bladder 23. In the illustrated embodiment, a two-loop cascade-type control is present. In this case, in an inner control circuit, a volume 45 of the container bladder 23 is taken into consideration which is influenced by a bladder gas supply 46. In the outer control circuit, the contact of the molding device 47 of the container bladder 23 is taken into consideration, which actually is influenced through the stretching system 48. The actual control system is significantly more complex because of the complex and partially non linear relationships between the individual control and adjusting valuables.

The determination of the above mentioned measuring variables can take place, for example, with the use of a flux sensor 49 whose measurement value is converted into the resulting volume and the contact of the mold can be determined with the use of a positioning sensor 50.

The invention claimed is:

1. Method for stretch blow-molding containers, comprising the steps of:
    thermally conditioning a preform of a thermoplastic material along a transport path in the area of a heating section;
    placing the preform in a blow mold;
    applying a blowing pressure to the preform so that the preform, via an intermediate stage called a container bladder, subsequently develops into the container in the blow mold;
    monitoring development of the container bladder in the blow mold during deformation of the preform in the blow mold by measuring and evaluating, using a control device, at least two parameters during development of the container bladder, which at least two parameters characterize the temporal development of the container bladder, the measuring including making chronological measurements while the container bladder is being blow molded during the intermediate stage, the at least two parameters being selected from the group consisting of: contact of the container bladder with the blow mold measured using contact-sensitive sensors, contact of the container bladder with the blow mold measured by electric field measurement or optical sensors, pressure sequence, gas volume supplied to the container bladder, stretching speed, stretching force, and temperature in a material of the preform to be formed;
    adapting the measured parameter to a corresponding desired value by changing at least one adjusting variable that influences the deformation process in dependence on the evaluation of the development of the container bladder in the blow mold within a closed control circuit; and
    controlling development of the container bladder within the blow mold during formation of the container.

2. Method according to claim 1, wherein a contact of a container bladder (23) with an inner side of the blow mold (4) is measured at least chronologically and at least over sections.

3. Method according to claim 1, wherein a position of the stretching rod (11) is measured.

4. Method according to claim 1, wherein a speed of the stretching rod (11) is measured.

5. Method according to claim 1, wherein a stretching force is measured.

6. Method according to claim 1, wherein a blowing pressure is measured.

7. Method according to claim 1, wherein a blow gas volume is measured.

8. Method according to claim 1, wherein the at least two parameters are controlled corresponding to a desired value profile which is changeable over time.

9. Method according to claim 1, wherein the position of the stretching rod (11) is regulated.

10. Method according to claim 1, wherein the speed of the stretching rod (11) is regulated.

11. Method according to claim 1, wherein the stretching force is regulated.

12. Method according to claim 1, wherein the blowing pressure is regulated.

13. Method according to claim 1, wherein the blow gas volume is regulated.

14. Method according to claim 1, wherein the stretching speed is used as the adjusting variable.

15. Method according to claim 1, wherein the stretching rod position is the adjusting variable.

16. Method according to claim 1, wherein the stretching force is the adjusting variable.

17. Method according to claim 1, wherein the blowing pressure is the adjusting variable.

18. Method according to claim 1, wherein the blow gas volume is the adjusting variable.

19. Method according to claim 1, wherein the measured value is supplied to a regulation-technological model which generates the at least one adjusting variable.

20. Device for stretch blow molding containers of a thermoplastic material, which has at least one heating section arranged along a transport path of a preform and a blowing station provided with a blow mold, wherein the blowing station applies a blowing pressure to the preform so that the preform, via an intermediate stage called a container bladder, subsequently develops into the container in the blow mold, wherein a sensor is configured and arranged to determine a parameter in the blow mold characterizing development of the container bladder in the blow mold during the intermediate stage while the preform develops into the container, wherein the sensor is connected to a control device which has an evaluating unit for the parameter and at least one additional parameter, and which generates at least one adjusting variable influencing the deformation process by regulating the sequence of a time of the contract of the container bladder (23) with the blow mold (4), and which is arranged in a closed control circuit for adjusting the measured parameter to a corresponding desired value, wherein the control unit evaluates development of the container bladder, the parameter and the at least one additional parameter being selected from the group consisting of: contact of the container bladder with the blow mold measured using contact-sensitive sensors, contact of the container bladder with the blow mold measured by electric field measurement or optical sensors, pressure sequence, gas volume supplied to the container bladder, stretching speed, stretching force, and temperature in a material of the preform to be formed.

21. Device according to claim 20, wherein the sensor is constructed for determining a contact of the container bladder (23) with the blow mold form.

22. Device according to claim 20, wherein the sensor is constructed for determining a stretching rod position.

23. Device according to claim 20, wherein the sensor is constructed for determining a stretching speed.

24. Device according to claim 20, wherein the sensor is constructed for determining a stretching force.

25. Device according to claim 20, wherein the sensor is constructed for determining a blow pressure.

26. Device according to claim 20, wherein the sensor is constructed for determining a blow gas volume.

27. Device according to claim 20, wherein the control device is constructed for regulating the stretching rod position.

28. Device according to claim 20, wherein the control device is constructed for regulating a stretching speed.

29. Device according to claim 20, wherein the control device is constructed for regulating a stretching force.

30. Device according to claim 20, wherein the control device is constructed for regulating a blowing pressure.

31. Device according to claim 20, wherein the control device is constructed for regulating a blow gas volume.

32. Device according to claim 20, wherein the control device is constructed for generating a stretching speed as an adjusting variable.

33. Device according to claim 20, wherein the control device is constructed for generating a stretching rod position as an adjusting variable.

34. Device according to claim 20, wherein the control device is constructed for generating a stretching force as an adjusting variable.

35. Device according to claim 20, wherein the control device is constructed for generating a blowing pressure as an adjusting variable.

36. Device according to claim 20, wherein the control device is constructed for generating a blow gas volume as an adjusting variable.

37. Device according to claim 20, wherein the control device includes a regulation-technical model for interconnecting at least one measured parameter with at least one adjusting variable.

* * * * *